(12) United States Patent
Parikh et al.

(10) Patent No.: US 7,616,218 B1
(45) Date of Patent: Nov. 10, 2009

(54) APPARATUS, SYSTEM, AND METHOD FOR CLIPPING GRAPHICS PRIMITIVES

(75) Inventors: Vimal S. Parikh, Fremont, CA (US); Andrew J. Tao, San Francisco, CA (US); Lordson L. Yue, Foster City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/295,355

(22) Filed: Dec. 5, 2005

(51) Int. Cl.
*G09G 5/00* (2006.01)
(52) U.S. Cl. ............ 345/620; 345/619; 345/622
(58) Field of Classification Search .......... 345/619–623
See application file for complete search history.

(56) References Cited

U.S. PATENT DOCUMENTS

| | | | |
|---|---|---|---|
| 3,889,107 A | 6/1975 | Sutherland | |
| 4,958,305 A | 9/1990 | Piazza | |
| 5,051,737 A | 9/1991 | Akeley et al. | |
| 5,224,210 A | 6/1993 | Pinedo et al. | |
| 5,420,980 A | 5/1995 | Pinedo et al. | |
| 5,428,779 A | 6/1995 | Allegrucci et al. | |
| 5,444,838 A | 8/1995 | Kommrusch et al. | 345/620 |
| 5,455,958 A | 10/1995 | Flurry et al. | |
| 5,564,009 A | 10/1996 | Pinedo et al. | |
| 5,572,657 A | 11/1996 | Pinedo et al. | |
| 5,613,052 A | 3/1997 | Narayanaswami | |
| 5,720,019 A | 2/1998 | Koss et al. | |
| 5,838,331 A | 11/1998 | DeBry | |
| 5,877,773 A | 3/1999 | Rossin et al. | |
| 5,949,421 A | 9/1999 | Ogletree et al. | |
| 5,986,669 A | 11/1999 | Kirkland | |
| 6,052,128 A * | 4/2000 | Narayanaswami et al. | 345/620 |
| 6,052,129 A * | 4/2000 | Fowler et al. | 345/620 |
| 6,061,066 A | 5/2000 | Priem | |
| 6,137,497 A * | 10/2000 | Strunk et al. | 345/620 |
| 6,181,352 B1 | 1/2001 | Kirk et al. | |
| 6,208,361 B1 | 3/2001 | Gossett | |
| 6,359,630 B1 * | 3/2002 | Morse et al. | 345/620 |
| 6,459,438 B1 | 10/2002 | Mang | |
| 6,507,348 B1 | 1/2003 | Mang et al. | |
| 6,512,524 B1 | 1/2003 | Mang | |
| 6,552,723 B1 | 4/2003 | Duluk, Jr. et al. | |
| 6,567,084 B1 | 5/2003 | Mang et al. | 345/426 |
| 6,577,305 B1 | 6/2003 | Duluk, Jr. et al. | |
| 6,597,363 B1 | 7/2003 | Duluk et al. | |
| 6,621,495 B1 | 9/2003 | Cook et al. | |
| 6,686,924 B1 * | 2/2004 | Mang et al. | 345/620 |
| 6,774,895 B1 | 8/2004 | Papakipos et al. | 345/422 |

(Continued)

OTHER PUBLICATIONS

U.S. Appl. No. 11/195,389, filed Aug. 2, 2005, Moreton et al.

*Primary Examiner*—Chante Harrison
(74) *Attorney, Agent, or Firm*—Cooley Godward Kronish LLP (57) ABSTRACT

Apparatus, system, and method for clipping graphics primitives are described. In one embodiment, a clipping module includes a clipping engine and a clipping controller connected to the clipping engine. The clipping controller is configured to determine which edges of an input graphics primitive intersect a first clipping plane. The clipping controller is configured to direct the clipping engine to clip, with respect to the first clipping plane, a first pair of edges of the input graphics primitive in response to determining that the first pair of edges intersect the first clipping plane.

8 Claims, 7 Drawing Sheets

U.S. PATENT DOCUMENTS

| | | |
|---|---|---|
| 6,782,432 B1 | 8/2004 | Nelson et al. |
| 6,928,646 B1 | 8/2005 | James et al. |
| 7,088,359 B2 | 8/2006 | Huang et al. |
| 7,292,242 B1 * | 11/2007 | Wittenbrink et al. ........ 345/421 |
| 7,292,254 B1 | 11/2007 | Yue et al. .................... 345/620 |
| 7,315,310 B2 * | 1/2008 | Sakamoto et al. ........... 345/620 |
| 2003/0095137 A1 | 5/2003 | Lu et al. |

* cited by examiner

APPARATUS, SYSTEM, AND METHOD FOR CLIPPING GRAPHICS PRIMITIVES

BRIEF DESCRIPTION OF THE INVENTION

The invention relates generally to graphics processing. More particularly, the invention relates to an apparatus, system, and method for clipping graphics primitives.

BACKGROUND OF THE INVENTION

In conventional graphics processing systems, an object to be displayed is typically represented as a set of one or more graphics primitives. Examples of graphics primitives include one-dimensional graphics primitives, such as lines, and two-dimensional graphics primitives, such as polygons.

Conventional graphics processing systems sometimes implement techniques for clipping graphics primitives. Clipping typically refers to a set of operations that determine which portions of an object are to be displayed with respect to a set of clipping planes. Various techniques have been developed for clipping graphics primitives. Of these techniques, the Sutherland-Hodgeman technique is perhaps the most commonly used. The Sutherland-Hodgeman technique can be used to clip a polygon with respect to a set of clipping planes by using an output from a set of clipping operations with respect to one clipping plane as an input for a set of clipping operations with respect to another clipping plane, and so on until all clipping planes have been processed. For example, to clip a polygon with respect to six clipping planes, the Sutherland-Hodgeman technique typically clips each edge of the polygon with respect to a first clipping plane to produce a first clipped polygon. Each edge of the first clipped polygon is then typically clipped with respect to a second clipping plane to produce a second clipped polygon. The second clipped polygon is then typically clipped with respect to a third clipping plane, and so on until all six clipping planes have been processed.

Conventional clipping techniques can be computationally intensive, particularly when clipping polygons with respect to multiple clipping planes. In the case of the Sutherland-Hodgeman technique, each clipping operation with respect to a particular clipping plane can involve a number of computationally intensive data manipulations. Indeed, one significant drawback of the Sutherland-Hodgeman technique is that this technique typically clips a polygon with respect to all clipping planes even if the polygon simply requires clipping with respect to a subset of the clipping planes. Another significant drawback of the Sutherland-Hodgeman technique is that this technique typically clips all edges of a polygon with respect to a particular clipping plane even if simply a subset of the edges requires clipping with respect to that clipping plane. As a result of these drawbacks, the Sutherland-Hodgeman technique can lead to inefficiencies in terms of performing unnecessary clipping operations. In particular, such inefficiencies can translate into processing times that are longer than desired and that are relatively unpredictable, particularly since a number of edges to be clipped can increase in a variable manner after clipping is performed with respect to each successive clipping plane. In addition, such inefficiencies can translate into enhanced implementation cost and complexity.

It is against this background that a need arose to develop the apparatus, system, and method described herein.

SUMMARY OF THE INVENTION

In one aspect, the invention relates to a clipping module. In one embodiment, the clipping module includes a clipping engine and a clipping controller connected to the clipping engine. The clipping controller is configured to determine which edges of an input graphics primitive intersect a first clipping plane. The clipping controller is configured to direct the clipping engine to clip, with respect to the first clipping plane, a first pair of edges of the input graphics primitive in response to determining that the first pair of edges intersect the first clipping plane.

In another aspect, the invention relates to a graphics processing apparatus. In one embodiment, the graphics processing apparatus includes a graphics pipeline, which includes a clipping module. The clipping module is configured to clip an input graphics primitive with respect to a set of clipping planes, such that an output graphics primitive is produced in accordance with a processing time that is substantially linearly related to a number of clipping planes of the set of clipping planes with respect to which clipping is required.

In a further aspect, the invention relates to a graphics processing method. In one embodiment, the graphics processing method includes selecting a first set of edges of an input graphics primitive based on whether the first set of edges intersect a first clipping plane of a set of clipping planes. The graphics processing method also includes clipping the first set of edges with respect to the first clipping plane to produce a first clipped graphics primitive.

Advantageously, embodiments of the invention provide improved efficiency in terms of avoiding or reducing unnecessary clipping operations that might otherwise be performed, thus resulting in shorter and more predictable processing times and reduced implementation cost and complexity. For example, in the case of a polygon that is simple and convex, some embodiments of the invention exploit an appreciation that a particular clipping plane is either not intersected by the polygon or is intersected by a pair of edges of the polygon.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
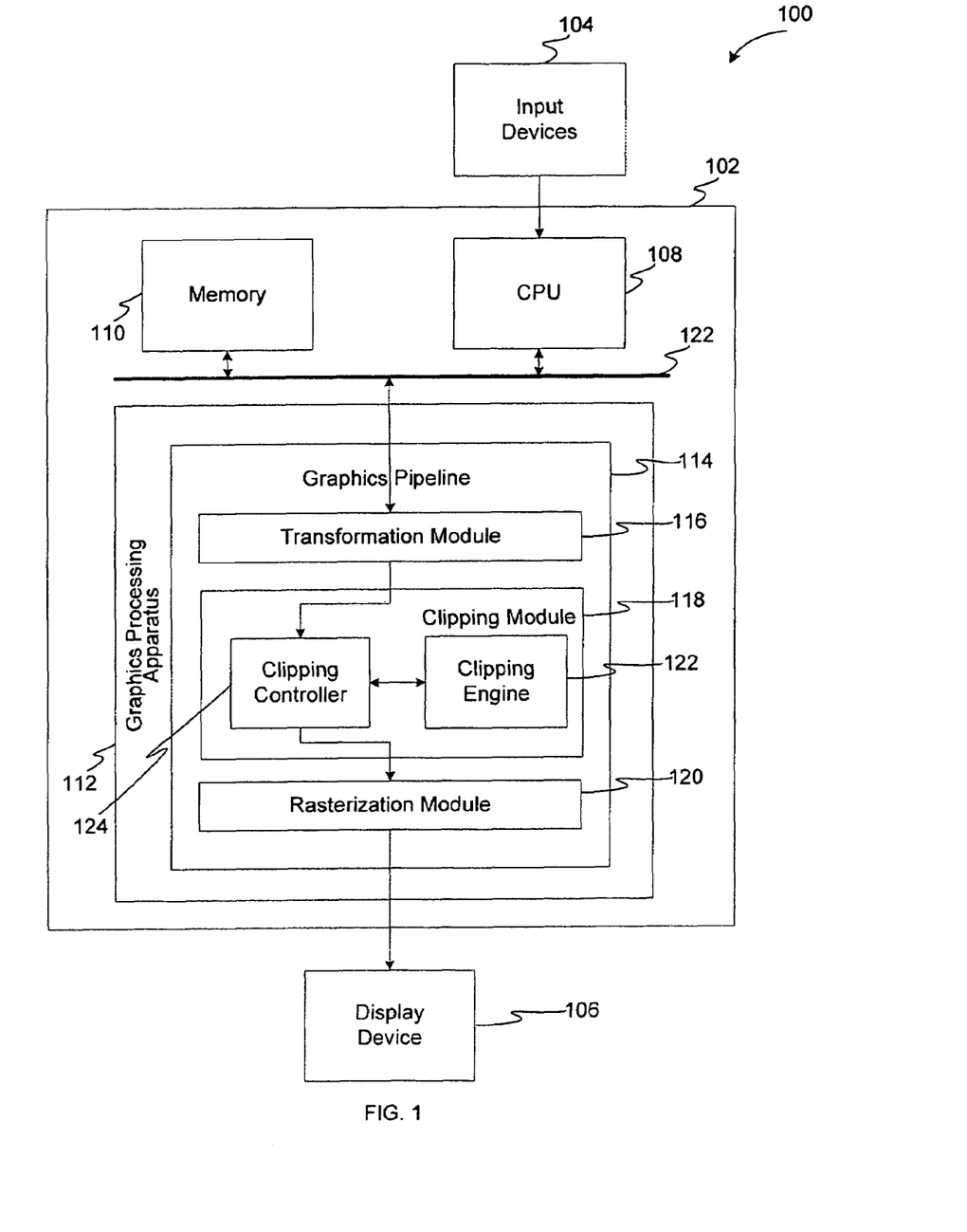
FIG. 1 illustrates a computer system that is implemented in accordance with an embodiment of the invention.

FIG. 1 illustrates a computer system 100 that is implemented in accordance with an embodiment of the invention. The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of input devices 104, which can include, for example, a keyboard and a mouse. The computer 102 is also connected to a display device 106, which can be, for example, a television set, a Cathode Ray Tube monitor, or a Liquid Crystal Display monitor.

The computer 102 includes a Central Processing Unit ("CPU") 108, which is connected to a memory 110 over a bus 122. The memory 110 can include, for example, a Random Access Memory ("RAM") and a Read Only Memory ("ROM"). As illustrated in FIG. 1, the computer 102 also includes a graphics processing apparatus 112 that is connected to the CPU 108 and the memory 110 over the bus 122. The graphics processing apparatus 112 can be, for example, a Graphics Processing Unit ("GPU").

In the illustrated embodiment, the graphics processing apparatus 112 performs a number of operations to display an object using the display device 106. Referring to FIG. 1, the graphics processing apparatus 112 includes a graphics pipeline 114, which includes a number of modules that are connected to one another and that form different stages of the graphics pipeline 114. In particular, the graphics pipeline 114 includes a transformation module 116, a clipping module 118, and a rasterization module 120. While three modules are illustrated in FIG. 1, it is contemplated that the graphics pipeline 114 can include more or less modules depending on the particular implementation. It is also contemplated that these modules can be combined, sub-divided, or re-ordered for another implementation.

As illustrated in FIG. 1, the transformation module 116 receives a set of graphics primitives that represent the object to be displayed. In the illustrated embodiment, the graphics primitives correspond to polygons. However, it is contemplated that other types of graphics primitives can also be used. Referring to FIG. 1, the transformation module 116 performs a number of transformation operations on the graphics primitives. For example, coordinate data related to the graphics primitives can be rotated, scaled, translated, or converted from one coordinate space into another coordinate space. It is also contemplated that color data, specularity data, or texture data related to the graphics primitives can be modified, such as in connection with lighting operations. The transformation module 116 then delivers the graphics primitives that have been transformed in such manner to the clipping module 118.

As illustrated in FIG. 1, the clipping module 118 clips the graphics primitives with respect to a set of clipping planes. In the illustrated embodiment, the clipping planes define a viewing region, which can be a two-dimensional viewing area or a three-dimensional viewing volume. It is also contemplated that the clipping planes can alternatively, or in conjunction, include a set of model clipping planes, which can be specified by a user to further restrict the viewing region or to remove certain portions of the object from view. The clipping module 118 serves to increase efficiency of the graphics pipeline 114, as further processing on portions of the object that lie outside the viewing region need not be performed. Also, by using the set of model clipping planes, the clipping module 118 can allow portions of the object that were previously hidden from view to be visualized.

Referring to FIG. 1, the clipping module 118 includes a clipping engine 122, which performs a number of clipping operations on the graphics primitives to produce clipped graphics primitives. The clipping module 118 also includes a clipping controller 124, which is connected to the clipping engine 122. The clipping controller 124 coordinates the clipping operations that are performed by the clipping engine 122. In addition, the clipping controller 124 coordinates delivery of the clipped graphics primitives to the rasterization module 120.

Advantageously, the clipping controller 124 directs operation of the clipping engine 122 based on clipping requirements of the graphics primitives with respect to the clipping planes. In particular, if a graphics primitive requires clipping with respect to a particular clipping plane, the clipping controller 124 determines which edges of the graphics primitive require clipping with respect to that clipping plane. The clipping controller 124 then directs the clipping engine 122 to simply clip those edges with respect to that clipping plane, without having to clip any remaining edge of the graphics primitive with respect to that clipping plane. On the other hand, if the graphics primitive does not require clipping with respect to that clipping plane, the clipping controller 124 need not direct the clipping engine 122 to clip any edge of the graphics primitive with respect to that clipping plane. By operating in such manner, the clipping module 118 provides improved efficiency in terms of avoiding or reducing unnecessary clipping operations that might otherwise be performed, thus resulting in processing times that are shorter and more predictable as compared with a conventional clipping implementation that clips all edges with respect to each clipping plane. In addition, such improved efficiency translates into reduced implementation cost and complexity for the clipping module 118.

Referring to FIG. 1, the rasterization module 120 performs a number of operations on the clipped graphics primitives to produce a set of pixels that represent the object to be displayed. For example, coordinate data related to the clipped graphics primitives can be interpolated to assign the pixels to represent the object. It is also contemplated that color data, specularity data, or texture data related to the clipped graphics primitives can be interpolated in connection with pixel assignment. The rasterization module 120 then delivers the pixels for display using the display device 106.

Figure 2:
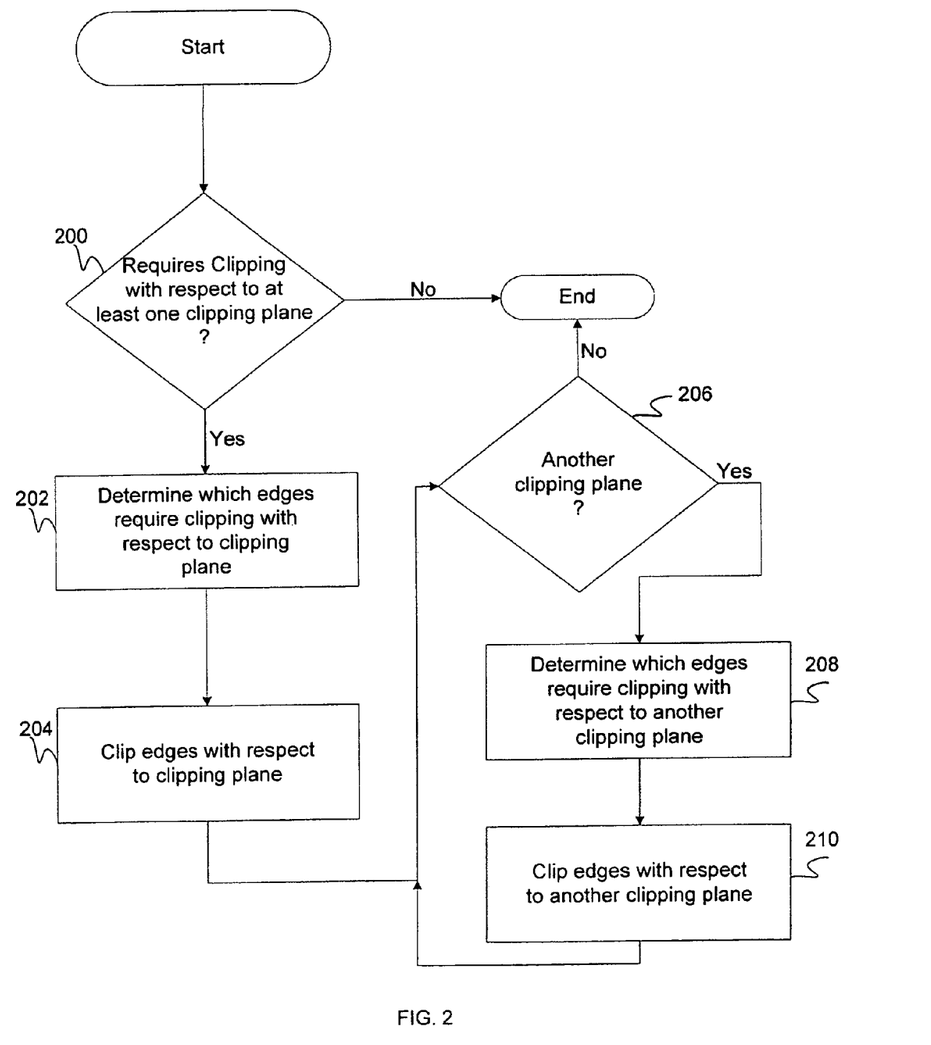
FIG. 2 illustrates a flow chart for clipping an input graphics primitive with respect to a set of clipping planes, according to an embodiment of the invention.

Attention next turns to FIG. 2, which illustrates a flow chart for clipping an input graphics primitive with respect to a set of clipping planes, according to an embodiment of the invention. In particular, FIG. 2 illustrates operations that can be performed by a clipping module (e.g., the clipping module 118) to clip the input graphics primitive with respect to a viewing region defined by the clipping planes.

Referring to FIG. 2, a clipping controller (e.g., the clipping controller 124) initially determines whether the input graphics primitive requires clipping with respect to at least one of the clipping planes (block 200). In the illustrated embodiment, the clipping controller performs such determination based on whether the input graphics primitive intersects at least one of the clipping planes.

If the input graphics primitive does not intersect any of the clipping planes, the clipping controller either trivially accepts the input graphics primitive as being completely within the viewing region or trivially rejects the input graphics primitive as being completely outside of the viewing region. In the case that the input graphics primitive is trivially accepted, the clipping controller designates the input graphics primitive as an output graphics primitive and proceeds to an end configuration. In the case that the input graphics primitive is trivially rejected, the clipping controller discards the input graphics primitive from further processing and proceeds to the end configuration. In either case, a clipping engine (e.g., the clipping engine 122) need not clip any edge of the input graphics primitive with respect to any of the clipping planes, thus avoiding or reducing unnecessary clipping operations that might otherwise be performed.

On the other hand, if the input graphics primitive intersects at least one of the clipping planes, namely a first clipping plane, the clipping controller next determines which edges of the input graphics primitive require clipping with respect to the first clipping plane (block 202). In the illustrated embodiment, the clipping controller performs such determination based on which edges of the input graphics primitive intersect the first clipping plane. Based on such determination, the clipping controller then selects those edges to be clipped with respect to the first clipping plane.

Next, the clipping engine clips those edges with respect to the first clipping plane to produce a first clipped graphics primitive (block 204). In the illustrated embodiment, the clipping engine performs a set of clipping operations to determine intersections of those edges with respect to the first clipping plane. Advantageously, the clipping engine need not clip any remaining edge of the input graphics primitive with respect to the first clipping plane, thus avoiding or reducing unnecessary clipping operations that might otherwise be performed.

Referring to FIG. 2, the clipping controller next determines whether clipping is required with respect to another one of the clipping planes (block 206). In the illustrated embodiment, the clipping controller performs such determination based on whether the first clipped graphics primitive intersects another one of the clipping planes. As further described below, such determination allows an "early out" capability that can provide further improvements in terms of avoiding or reducing unnecessary clipping operations. It is also contemplated that such determination can be based on whether the input graphics primitive intersects another one of the clipping planes.

If the first clipped graphics primitive does not intersect another one of the clipping planes, the clipping controller designates the first clipped graphics primitive as an output graphics primitive and proceeds to the end configuration. On the other hand, if the first clipped graphics primitive intersects another one of the clipping planes, namely a second clipping plane, processing next proceeds with respect to the second clipping plane in a similar manner as described above.

In particular, as illustrated in FIG. 2, the clipping controller determines which edges of the first clipped graphics primitive require clipping with respect to the second clipping plane (block 208). Based on such determination, the clipping controller then selects those edges to be clipped with respect to the second clipping plane. Next, the clipping engine clips those edges with respect to the second clipping plane to produce a second clipped graphics primitive (block 210). Advantageously, the clipping engine need not clip any remaining edge of the first clipped graphics primitive with respect to the second clipping plane, thus avoiding or reducing unnecessary clipping operations that might otherwise be performed.

Referring to FIG. 2, the clipping controller next determines whether clipping is required with respect to yet another one of the clipping planes (block 206). In the illustrated embodiment, the clipping controller performs such determination based on whether the second clipped graphics primitive intersects yet another one of the clipping planes, thus allowing an "early out" capability. It is also contemplated that such determination can be based on whether the input graphics primitive intersects yet another one of the clipping planes.

If the second clipped graphics primitive does not intersect yet another one of the clipping planes, the clipping controller designates the second clipped graphics primitive as an output graphics primitive and proceeds to an end configuration. On the other hand, if the second clipped graphics primitive intersects yet another one of the clipping planes, namely a third clipping plane, processing next proceeds with respect to the third clipping plane in a similar manner as described above, and so on until each of the clipping planes with respect to which clipping is required has been processed.

The operations described in connection with FIG. 2 can be further understood with reference to FIG. 3A through FIG. 3C, which illustrate an example of an input graphics primitive 300 that is clipped with respect to a viewing area 302. In the illustrated example, the viewing area 302 is defined by a set of clipping planes, including a left clipping plane 304, a right clipping plane 306, a bottom clipping plane 308, and a top clipping plane 310.

Figure 3A:
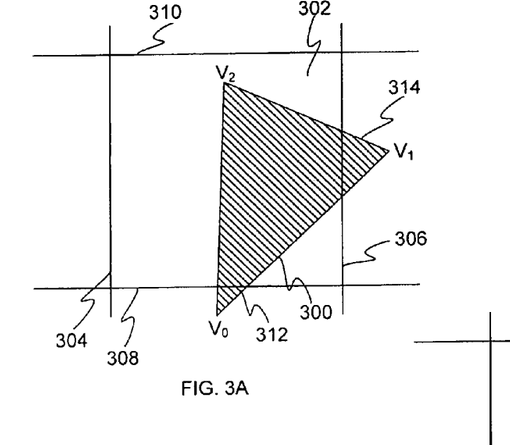
FIG. 3A through FIG. 3C illustrate an input graphics primitive that is clipped in accordance with an embodiment of the invention.

Referring to FIG. 3A, the input graphics primitive 300 corresponds to a triangle, which is a polygon that is simple and convex. As can be appreciated, a polygon is typically referred to as being simple if it has edges that define a single, non-intersecting boundary, and a simple polygon is typically referred to as being convex if it has no internal angles that are greater than 180°. Other examples of polygons that are simple and convex include quadrilaterals, pentagons, hexagons, and heptagons. As illustrated in FIG. 3A, the input graphics primitive 300 is defined by a set of vertices $(V_0, V_1, V_2)$, such that different pairs of vertices define various edges of the input graphics primitive 300. For example, the pair of vertices $(V_0, V_1)$ define an edge 312 of the input graphics primitive 300, and the pair of vertices $(V_1, V_2)$ define an edge 314 of the input graphics primitive 300.

As illustrated in FIG. 3A, the input graphics primitive 300 intersects the right clipping plane 306 and the bottom clipping plane 308. Thus, it can be determined that clipping is required with respect to both the right clipping plane 306 and the bottom clipping plane 308. In the illustrated example, processing next proceeds with respect to the right clipping plane 306 followed by processing with respect to the bottom clipping plane 308. However, it is contemplated that this processing order can be switched for another implementation.

Since the input graphics primitive 300 corresponds to a polygon that is simple and convex, it can be appreciated that a particular clipping plane is either intersected by none of the edges of the input graphics primitive 300 or is intersected by a pair of edges of the input graphics primitive 300. Such appreciation can be advantageously exploited as described below. In particular, once it is determined that the input graphics primitive 300 intersects the right clipping plane 306, processing proceeds by determining which pair of edges intersect the right clipping plane 306 and selecting that pair of edges to be clipped with respect to the right clipping plane 306. Referring to FIG. 3A, the right clipping plane 306 is intersected by the pair of edges 312 and 314, which are selected for clipping with respect to the right clipping plane 306.

Figure 3B:
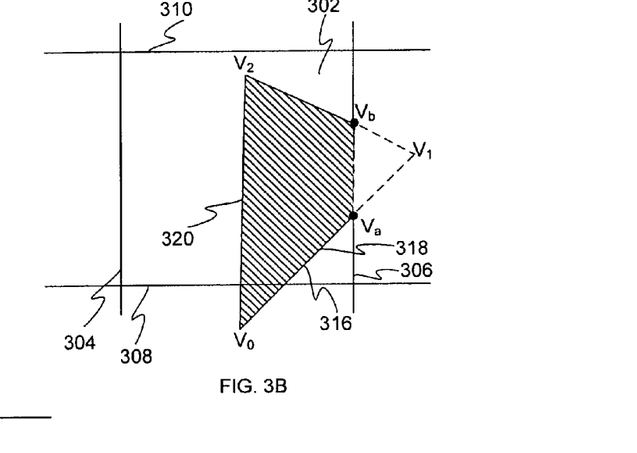

As illustrated in FIG. 3A and FIG. 3B, the pair of edges 312 and 314 are next clipped with respect to the right clipping plane 306 to produce a first clipped graphics primitive 316. In the illustrated example, a clipping operation is performed on each edge requiring clipping to determine a new vertex, which corresponds to an intersection of that edge with respect to a particular clipping plane. Since the input graphics primitive 300 corresponds to a polygon that is simple and convex, a pair of clipping operations are performed on the input graphics primitive 300 to produce the first clipped graphics primitive 316.

Referring to FIG. 3B, the first clipped graphics primitive 316 also corresponds to a polygon that is simple and convex, namely a quadrilateral. As illustrated in FIG. 3B, the first clipped graphics primitive 316 is defined by a set of vertices ($V_0$, $V_a$, $V_b$, $V_2$), such that different pairs of vertices define various edges of the first clipped graphics primitive 316. For example, the pair of vertices ($V_0$, $V_a$) define an edge 318 of the first clipped graphics primitive 316, and the pair of vertices ($V_0$, $V_2$) define an edge 320 of the first clipped graphics primitive 316.

As illustrated in FIG. 3B, the first clipped graphics primitive 316 intersects the bottom clipping plane 308 and, thus, requires clipping with respect to the bottom clipping plane 308. Since the first clipped graphics primitive 316 corresponds to a polygon that is simple and convex, it can be similarly appreciated that a particular clipping plane is either intersected by none of the edges of the first clipped graphics primitive 316 or is intersected by a pair of edges of the first clipped graphics primitive 316. In the illustrated example, processing proceeds by determining which pair of edges intersect the bottom clipping plane 308 and selecting that pair of edges to be clipped with respect to the bottom clipping plane 308. Referring to FIG. 3B, the bottom clipping plane 308 is intersected by the pair of edges 318 and 320, which are selected for clipping with respect to the bottom clipping plane 308.

Figure 3C:
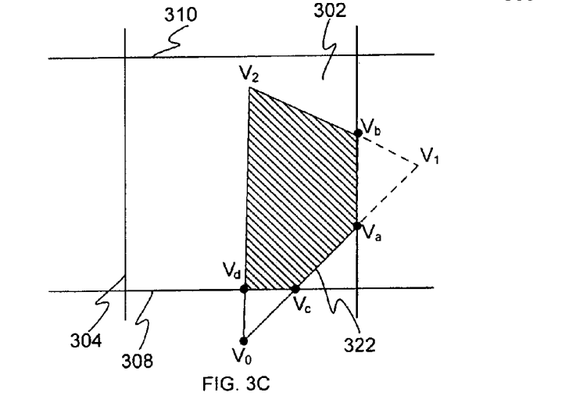

As illustrated in FIG. 3B and FIG. 3C, the pair of edges 318 and 320 are next clipped with respect to the bottom clipping plane 308 to produce a second clipped graphics primitive 322. Since the first clipped graphics primitive 316 corresponds to a polygon that is simple and convex, a pair of clipping operations are performed on the first clipped graphics primitive 316 to produce the second clipped graphics primitive 322.

Referring to FIG. 3C, the second clipped graphics primitive 322 also corresponds to a polygon that is simple and convex, namely a pentagon. As illustrated in FIG. 3C, the second clipped graphics primitive 322 is defined by a set of vertices ($V_c$, $V_a$, $V_b$, $V_2$, $V_d$), such that different pairs of vertices define various edges of the second clipped graphics primitive 322. The second clipped graphics primitive 322 lies within the viewing area 302 and is, thus, designated as an output graphics primitive.

The "early out" capability described in connection with FIG. 2 can be further understood with reference to FIG. 4A and FIG. 4B, which illustrate another example of an input graphics primitive 400 that is clipped with respect to a viewing area 402. As in the previous example, the viewing area 402 is defined by a set of clipping planes, including a left clipping plane 404, a right clipping plane 406, a bottom clipping plane 408, and a top clipping plane 410.

Figure 4A:
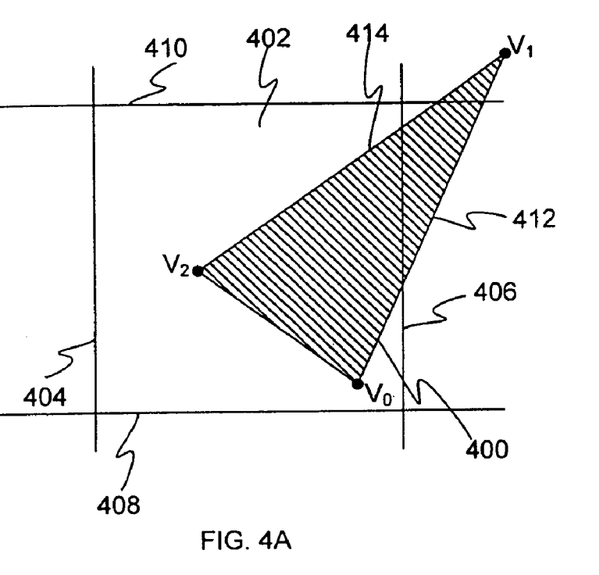
FIG. 4A and FIG. 4B illustrate another input graphics primitive that is clipped in accordance with an embodiment of the invention.

Referring to FIG. 4A, the input graphics primitive 400 corresponds to a triangle and is defined by a set of vertices ($V_0$, $V_1$, $V_2$), such that different pairs of vertices define various edges of the input graphics primitive 400. For example, the pair of vertices ($V_0$, $V_1$) define an edge 412 of the input graphics primitive 400, and the pair of vertices ($V_1$, $V_2$) define an edge 414 of the input graphics primitive 400.

As illustrated in FIG. 4A, the input graphics primitive 400 intersects the right clipping plane 406 and the top clipping plane 410. Thus, it can be initially determined that clipping is required with respect to both the right clipping plane 406 and the top clipping plane 410. In the illustrated example, processing next proceeds with respect to the right clipping plane 406 followed by processing with respect to the top clipping plane 410. However, it is contemplated that this processing order can be switched for another implementation.

Referring to 4A, once it is determined that the input graphics primitive 400 intersects the right clipping plane 406, processing proceeds by determining which pair of edges intersect the right clipping plane 406 and selecting that pair of edges to be clipped with respect to the right clipping plane 406. Referring to FIG. 4A, the right clipping plane 406 is intersected by the pair of edges 412 and 414, which are selected for clipping with respect to the right clipping plane 406.

Figure 4B:
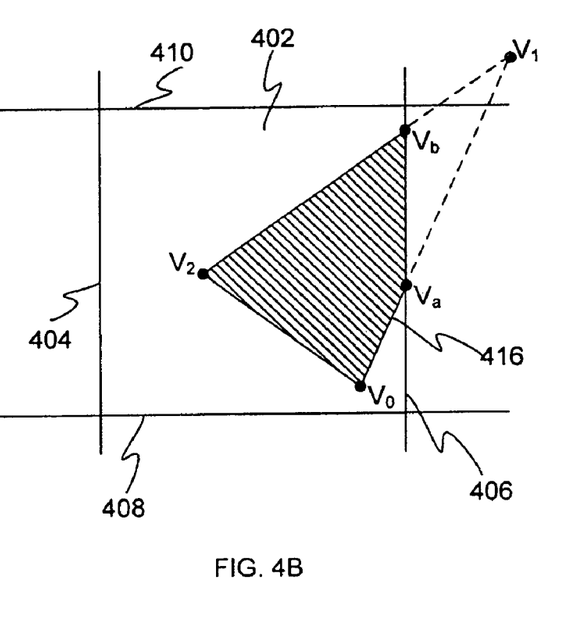

As illustrated in FIG. 4A and FIG. 4B, the pair of edges 412 and 414 are next clipped with respect to the right clipping plane 406 to produce a clipped graphics primitive 416. Referring to FIG. 4B, the clipped graphics primitive 416 corresponds to a quadrilateral and is defined by a set of vertices ($V_0$, $V_a$, $V_b$, $V_2$), such that different pairs of vertices define various edges of the clipped graphics primitive 416.

As illustrated in FIG. 4B, the clipped graphics primitive 416 does not intersect the top clipping plane 410, and, thus, it can be determined that clipping is no longer required with respect to the top clipping plane 410. Indeed, since the clipped graphics primitive 416 now lies within the viewing area 402, the clipped graphics primitive 416 is designated as an output graphics primitive, without having to perform any additional clipping operation. In such manner, unnecessary clipping operations that might otherwise be performed with respect to the top clipping plane 410 can be avoided.

Figure 5:
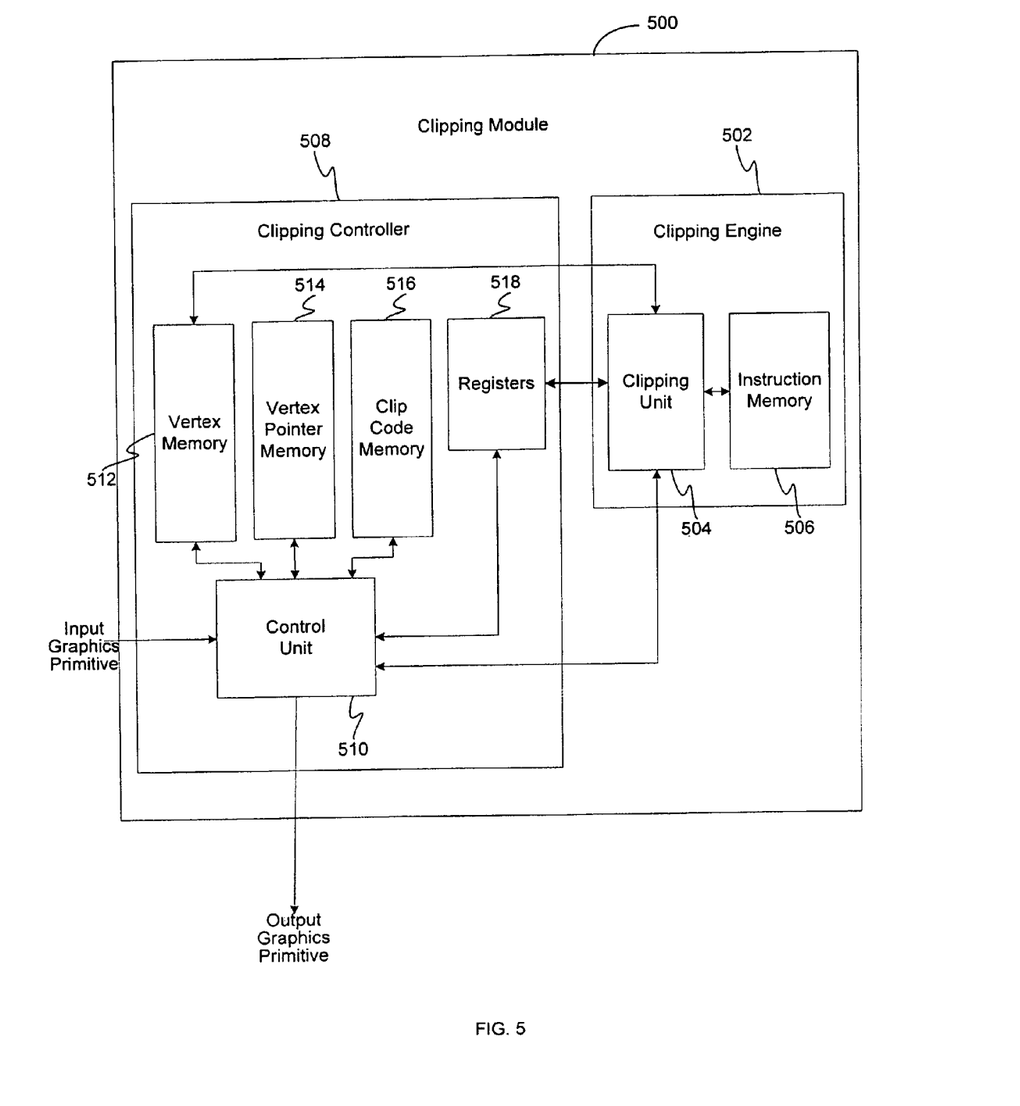
FIG. 5 illustrates a clipping module that is implemented in accordance with an embodiment of the invention.

The foregoing provides an overview of some embodiments of the invention. Attention next turns to FIG. 5, which illustrates a clipping module 500 that is implemented in accordance with an embodiment of the invention. The clipping module 500 includes a clipping engine 502, which clips an input graphics primitive with respect to a set of clipping planes to produce an output graphics primitive. As illustrated in FIG. 5, the clipping engine 502 is implemented as a microcoded engine and includes a clipping unit 504 and an instruction memory 506 that is connected to the clipping unit 504. The instruction memory 506 can be implemented as, for example, a ROM that stores computer code for performing clipping operations.

Referring to FIG. 5, the clipping module 500 also includes a clipping controller 508 that is connected to the clipping engine 502. The clipping controller 508 coordinates clipping operations that are performed by the clipping engine 502. As illustrated in FIG. 5, the clipping controller 508 includes a control unit 510, which is connected to a vertex memory 512, a vertex pointer memory 514, a clip code memory 516, and a set of registers 518. Each of the vertex memory 512, the vertex pointer memory 514, and the clip code memory 516 can be implemented as, for example, a RAM that stores data related to the clipping operations.

In the illustrated embodiment, the input graphics primitive corresponds to a polygon that is simple and convex, and the clipping module 500 is implemented to perform a predetermined number of clipping operations with respect to each of the clipping planes for which clipping is required. In particular, if clipping is required with respect to one of the clipping planes, the clipping controller 508 directs the clipping engine 502 to perform one pair of clipping operations with respect to that clipping plane. Similarly, if clipping is also required with respect to another one of the clipping planes, the clipping controller 508 directs the clipping engine 502 to perform another pair of clipping operations with respect to that clipping plane, and so on until each of the clipping planes with respect to which clipping is required has been processed. In the illustrated embodiment, the clipping engine 502 performs each pair of clipping operations substantially in parallel. However, it is also contemplated that each pair of clipping operations can be performed sequentially.

By operating in such manner, the clipping module 500 can clip the input graphics primitive in accordance with a processing time ("$T_{processing}$") that is shorter and more predictable as compared with a conventional clipping implementation. In particular, $T_{processing}$ is substantially linearly related to a number of clipping planes with respect to which clipping is required ("$n_{required}$") and is otherwise substantially invariant with respect to a shape of the input graphics primitive, an orientation of the input graphics primitive, and a processing order of the clipping planes. In the illustrated embodiment, $T_{processing}$ can be represented by the following equation: $T_{processing} \leq A \cdot n_{required} + B$, where A and B are constants. It is contemplated that the clipping module 500 can be implemented with an "early out" capability, such that $n_{required}$ can be less than or equal to a number of clipping planes that are intersected by the input graphics primitive ("$n_{intersect}$").

Figure 6A:
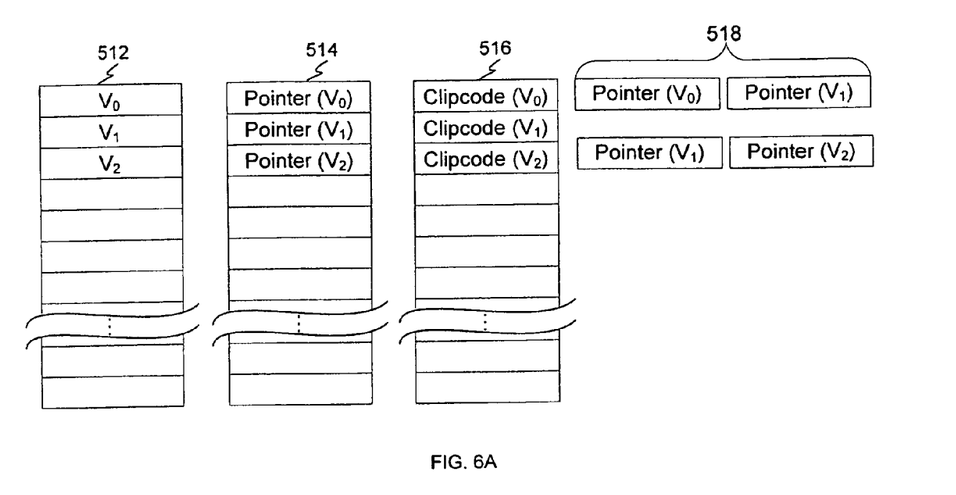
FIG. 6A through FIG. 6C illustrate contents of the clipping module of FIG. 5 at various stages of processing, according to an embodiment of the invention.
Figure 6B:
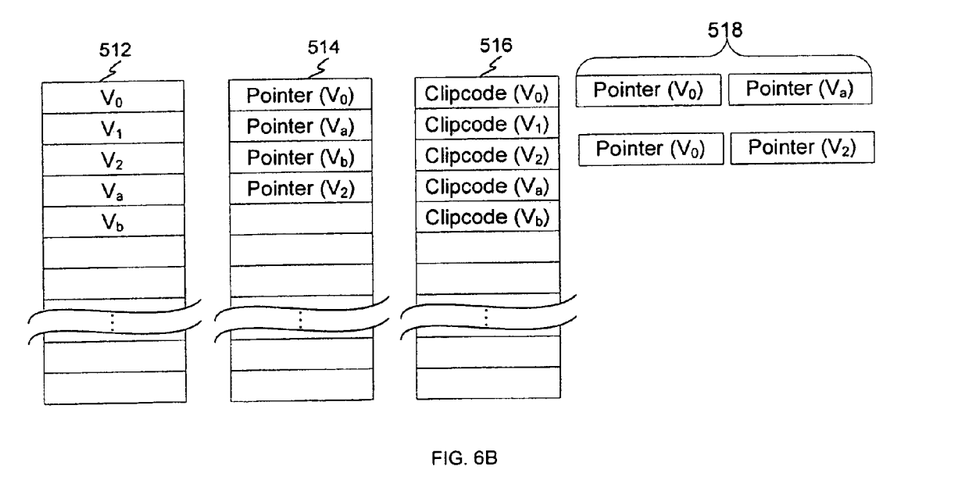
Figure 6C:
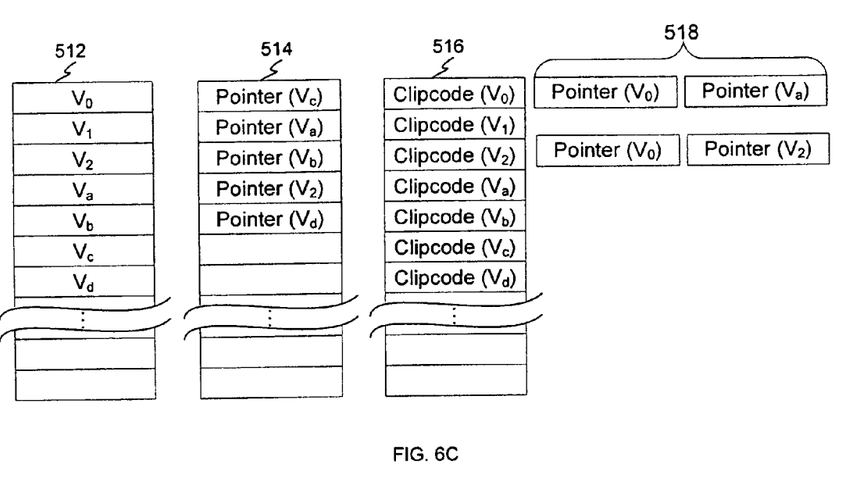

The operation of the clipping module 500 can be further understood with reference to FIG. 6A through FIG. 6C, which illustrate an example of contents of the vertex memory 512, the vertex pointer memory 514, the clip code memory 516, and the registers 518 at various stages of processing. In particular, these stages correspond to those previously described in connection with FIG. 3A through FIG. 3C, and, thus, reference will also be made to FIG. 3A through FIG. 3C below.

Referring to FIG. 3A and FIG. 6A, the control unit 510 initially receives the set of vertices ($V_0$, $V_1$, $V_2$) defining the input graphics primitive 300 and stores the set of vertices ($V_0$, $V_1$, $V_2$) in the vertex memory 512. The control unit 510 next calculates a set of clip codes corresponding to the set of vertices ($V_0$, $V_1$, $V_2$) and stores the set of clip codes in the clip code memory 516. As can be appreciated, a clip code is typically indicative of the relative positioning of a particular vertex with respect to a set of clipping planes. In the illustrated example, the control unit 510 also maintains a set of vertex pointers in the vertex pointer memory 514. Each vertex pointer references a memory location at which a particular vertex is stored in the vertex memory 512. As can be appreciated, use of the set of vertex pointers is advantageous in terms of reducing the amount of data manipulations involved.

By accessing the clip code memory 516, the control unit 510 determines that the pair of edges 312 and 314 of the input graphics primitive 300 require clipping with respect to the right clipping plane 306. In the illustrated example, the control unit 510 next selects the pair of edges 312 and 314 for clipping by appropriately storing vertex pointers in the registers 518. In particular, the control unit 510 stores the pair of vertex pointers (Pointer($V_0$), Pointer($V_1$)) to select the edge 312 and stores the pair of vertex pointers (Pointer($V_1$), Pointer($V_2$)) to select the edge 314. The control unit 510 then calls the clipping unit 504, which accesses the vertex memory 512 and the registers 518 to clip the pair of edges 312 and 314 with respect to the right clipping plane 306.

Referring next to FIG. 3B and FIG. 6B, the clipping unit 504 determines the pair of new vertices ($V_a$, $V_b$) and stores the pair of new vertices ($V_a$, $V_b$) in the vertex memory 512. The control unit 510 next calculates a pair of clip codes corresponding to the pair of new vertices ($V_a$, $V_b$) and stores the pair of clip codes in the clip code memory 516. In the illustrated example, the control unit 510 also updates the set of vertex pointers in the vertex pointer memory 514 to reference the set of vertices ($V_0$, $V_a$, $V_b$, $V_2$) defining the first clipped graphics primitive 316.

By accessing the clip code memory 516, the control unit 510 determines that the pair of edges 318 and 320 of the first clipped graphics primitive 316 require clipping with respect to the bottom clipping plane 308. In the illustrated example, the control unit 510 next selects the pair of edges 318 and 320 for clipping by appropriately storing or updating vertex pointers in the registers 518. The control unit 510 then calls the clipping unit 504, which accesses the vertex memory 512 and the registers 518 to clip the pair of edges 318 and 320 with respect to the bottom clipping plane 308.

Referring next to FIG. 3C and FIG. 6C, the clipping unit 504 determines the pair of new vertices ($V_c$, $V_d$) and stores the pair of new vertices ($V_c$, $V_d$) in the vertex memory 512. The control unit 510 next calculates a pair of clip codes corresponding to the pair of new vertices ($V_c$, $V_d$) and stores the pair of clip codes in the clip code memory 516. In the illustrated example, the control unit 510 also updates the set of vertex pointers in the vertex pointer memory 514 to reference the set of vertices ($V_c$, $V_a$, $V_b$, $V_2$, $V_d$) defining the second clipped graphics primitive 322.

By accessing the clip code memory 516, the control unit 510 determines that the second clipped graphics primitive 322 does not require clipping with respect to any remaining clipping plane. Accordingly, the control unit 510 designates the set of vertices ($V_c$, $V_a$, $V_b$, $V_2$, $V_d$) as defining an output graphics primitive and delivers the set of vertices ($V_c$, $V_a$, $V_b$, $V_2$, $V_d$) for subsequent processing.

It should be appreciated that the specific embodiments of the invention discussed above are provided by way of example, and various other embodiments are encompassed by the invention.

Some embodiments of the invention relate to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, machine code, such as produced by a compiler, and files containing higher-level code that are executed by a computer using an interpreter. For example, an embodiment of the invention may be implemented using Java, C++, or other object-oriented programming language and development tools. Additional examples of computer code include, but are not limited to, encrypted code and compressed code.

Some embodiments of the invention can be implemented using computer code in place of, or in combination with, hardwired circuitry. For example, with reference to FIG. 1, various components of the graphics pipeline 114 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A graphics processing apparatus, comprising:
   a graphics pipeline configured to process a first input graphics primitive and a second input graphics primitive, the first input graphics primitive and the second input graphics primitive having a different number of edges, the graphics pipeline including
   a clipping module configured to:
      select a first set of edges of the first input graphics primitive based on whether the first set of edges intersect a first clipping plane of a set of clipping planes;
      clip the selected first set of edges with respect to the first clipping plane to produce a first clipped graphics primitive;
      select a second set of edges of the second input graphics primitive based on whether the second set of edges intersect the first clipping plane; and
      clip the selected second set of edges with respect to the first clipping plane to produce a second clipped graphics primitive,
   wherein the clipping module is configured to determine whether the first input graphics primitive intersects the first clipping plane, and the clipping module is configured to perform, with respect to the first clipping plane, a predetermined number of clipping operations on the first input graphics primitive if the first input graphics primitive intersects the first clipping plane,
   wherein the clipping module is configured to determine whether the second input graphics primitive intersects the first clipping plane, and the clipping module is configured to perform, with respect to the first clipping plane, the same predetermined number of clipping operations on the second input graphics primitive if the second input graphics primitive intersects the first clipping plane.

2. The graphics processing apparatus of claim 1, wherein the predetermined number of clipping operations corresponds to a pair of clipping operations.

3. The graphics processing apparatus of claim 1, wherein the clipping module is configured to perform the predetermined number of clipping operations on the first input graphics primitive to produce the first clipped graphics primitive, and the clipping module is configured to determine whether the first clipped graphics primitive intersects a second clipping plane of the set of clipping planes.

4. The graphics processing apparatus of claim 3, wherein the clipping module is configured to designate the first clipped graphics primitive as a first output graphics primitive if the first clipped graphics primitive does not intersect the second clipping plane.

5. The graphics processing apparatus of claim 3, wherein the clipping module is configured to perform, with respect to the second clipping plane, the predetermined number of clipping operations on the first clipped graphics primitive if the first clipped graphics primitive intersects the second clipping plane.

6. The graphics processing apparatus of claim 3, wherein the clipping module is configured to perform the predetermined number of clipping operations on the second input graphics primitive to produce the second clipped graphics primitive, and the clipping module is configured to determine whether the second clipped graphics primitive intersects the second clipping plane.

7. The graphics processing apparatus of claim 6, wherein the clipping module is configured to designate the second clipped graphics primitive as a second output graphics primitive if the second clipped graphics primitive does not intersect the second clipping plane.

8. The graphics processing apparatus of claim 6, wherein the clipping module is configured to perform, with respect to the second clipping plane, the predetermined number of clipping operations on the second clipped graphics primitive if the second clipped graphics primitive intersects the second clipping plane.

* * * * *